(12) United States Patent
Arora et al.

(10) Patent No.: US 10,924,332 B2
(45) Date of Patent: Feb. 16, 2021

(54) NODE PROTECTION FOR BUM TRAFFIC FOR MULTI-HOMED NODE FAILURE

(71) Applicant: Juniper Networks, Inc., Sunnyvale, CA (US)

(72) Inventors: Kapil Arora, Bangalore (IN); Vikram Nagarajan, Bangalore (IN); Robert W. Kebler, Newburyport, MA (US); Princy T. Elizabeth, Bangalore (IN); Ramesh Kandula, Bangalore (IN); Soumyodeep Joarder, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 48 days.

(21) Appl. No.: 16/217,670

(22) Filed: Dec. 12, 2018

(65) Prior Publication Data

US 2020/0127885 A1    Apr. 23, 2020

(30) Foreign Application Priority Data

Oct. 17, 2018    (IN) .............................. 201841039383

(51) Int. Cl.
*H04L 12/24*    (2006.01)
*H04L 12/18*    (2006.01)

(52) U.S. Cl.
CPC ...... *H04L 41/0668* (2013.01); *H04L 12/1868* (2013.01); *H04L 12/1886* (2013.01); *H04L 41/0686* (2013.01)

(58) Field of Classification Search
CPC ............. H04L 41/0668; H04L 41/0686; H04L 12/1886; H04L 12/1868
See application file for complete search history.

(56) References Cited

U.S. PATENT DOCUMENTS 9,019,814 B1    4/2015  Mohanty et al.
2016/0021015 A1*  1/2016  Thoria ................ H04L 47/2483
                                                                370/235

(Continued)

OTHER PUBLICATIONS

Sajassi et al., "BGP MPLS-Based Ethernet VPN," RFC 7432, Internet Engineering Task Force (IETF), Feb. 2015, 56 pp.

(Continued)

*Primary Examiner* — Hassan Kizou
*Assistant Examiner* — Hector Reyes
(74) *Attorney, Agent, or Firm* — Shumaker & Sieffert, P.A.

(57) ABSTRACT

Techniques are described for facilitating node protection for Broadcast, unknown Unicast, and Multicast (BUM) traffic for a multi-homed node failure. For example, multi-homed provider edge (PE) devices each advertise egress node protection labels to an ingress PE device. In the event one of the multi-homed PE devices fails, the ingress PE device sends a BUM packet including the egress node protection labels for the failed node. When an egress PE device receives the BUM packet, the egress PE device determines whether the BUM packet includes the egress node protection labels and whether the egress PE device is operating as a backup designated forwarder (DF) on an Ethernet segment identifier (ESI) for which the failed node was the DF. If the BUM packet includes the egress node protection labels and the egress PE device is operating as a backup DF, the egress PE device forwards the BUM traffic to the ESI.

17 Claims, 3 Drawing Sheets

(56) References Cited

U.S. PATENT DOCUMENTS

| | | | |
|---|---|---|---|
| 2016/0191374 A1* | 6/2016 | Singh | H04L 45/22 |
| | | | 370/228 |
| 2017/0063600 A1* | 3/2017 | Singh | H04L 12/18 |
| 2017/0126587 A1* | 5/2017 | Ranns | H04L 47/825 |
| 2017/0141963 A1* | 5/2017 | Chalapathy | H04L 12/4641 |
| 2017/0195135 A1* | 7/2017 | Singh | H04L 45/16 |
| 2017/0201389 A1* | 7/2017 | Tiruveedhula | H04L 61/2069 |
| 2019/0109730 A1* | 4/2019 | Uttaro | H04L 45/50 |
| 2019/0222431 A1* | 7/2019 | Gao | H04L 12/4633 |

OTHER PUBLICATIONS

Pignataro et al. "Seamless Bidirectional Forwarding Detection (S-BFD)" RFC 7880, Internet Engineering Task Force (IETF), Jul. 2016, 24 pp.

Extended Search Report from counterpart European Application No. 19180610.8, dated Oct. 30, 2019, 9 pp.

Response to Extended Search Report dated Oct. 30, 2019 from counterpart European Application No. 19180610.8, filed Oct. 22, 2020, 11 pp.

* cited by examiner

NODE PROTECTION FOR BUM TRAFFIC FOR MULTI-HOMED NODE FAILURE

This application claims the benefit of Indian Provisional Patent Application No. 201841039383, filed on Oct. 17, 2018, the entire content of which is incorporated herein by reference.

TECHNICAL FIELD

The disclosure relates to computer networks and, more particularly, to forwarding traffic within computer networks.

BACKGROUND

A computer network is a collection of interconnected computing devices that can exchange data and share resources. Example network devices include switches or other layer two ("L2") devices that operate within the second layer of the Open Systems Interconnection ("OSI") reference model, i.e., the data link layer, and routers or other layer three ("L3") devices that operate within the third layer of the OSI reference model, i.e., the network layer. Network devices within computer networks often include a control unit that provides control plane functionality for the network device and forwarding units for routing or switching data units.

An Ethernet Virtual Private Network ("EVPN") may be used to extend two or more remote L2 customer networks through an intermediate L3 network (usually referred to as a "provider network"), in a transparent manner, i.e., as if the intermediate L3 network does not exist. In particular, the EVPN transports L2 communications, such as Ethernet packets or "frames," between customer networks via traffic engineered label switched paths ("LSP") through the intermediate network in accordance with one or more multiprotocol label switching (MPLS) protocols. In a typical configuration, provider edge ("PE") devices (e.g., routers and/or switches) coupled to the customer edge ("CE") devices of the customer networks define label switched paths within the provider network to carry encapsulated L2 communications as if these customer networks were directly attached to the same local area network ("LAN"). In some configurations, the PE devices may also be connected by an IP infrastructure in which case IP/GRE tunneling or other IP tunneling can be used between the network devices.

In an EVPN, L2 address learning (also referred to as "MAC learning") on a core-facing interface of a PE device occurs in the control plane rather than in the data plane (as happens with traditional bridging) using a routing protocol. For example, in EVPNs, a PE network device typically uses the Border Gateway Protocol ("BGP") (i.e., an L3 routing protocol) to advertise to other PE devices the MAC addresses the PE device has learned from the local consumer edge network devices to which the PE device is connected. As one example, a PE network device may use a BGP route advertisement message to announce reachability information for the EVPN, where the BGP route advertisement specifies one or more MAC addresses learned by the PE device instead of L3 routing information.

In an EVPN configuration referred to as active-active mode, an Ethernet segment includes multiple PE devices that provide multi-homed connectivity for one or more local customer network devices. Moreover, the multiple PE devices provide transport services through the intermediate network to a remote PE device, and each of the multiple PE devices in the Ethernet segment may forward Ethernet frames in the segment for the customer network device. In active-active mode, one of the multiple PE devices for the Ethernet segment is dynamically elected as the designated forwarder ("DF") for so called Broadcast, unidentified Unicast, or Multicast ("BUM") traffic that is to be flooded within the EVPN based on the MAC addressing information received from the other PE devices. The remaining PE devices that provide the customer network device multi-homed connectivity in the Ethernet segment are configured as a backup designated forwarder ("BDF" or "backup DF") or non-designated forwarder ("non-DF"). When a network failure occurs with respect to the current designated forwarder, the backup PE devices may execute a designated forwarder election algorithm to determine which of the backup PE network devices will become the new designated forwarder and, as a result, assume responsibility for forwarding L2 communications for the customer network device.

SUMMARY

In general, techniques are described for facilitating node protection for BUM traffic for a multi-homed node failure. For example, each of the multi-homed PE devices may advertise to an ingress PE device a label (referred to herein as "egress node protection label") that indicates an egress PE device that the advertising PE device is to protect in the event of a node failure. In the event a designated forwarder of the multi-homed PE devices goes down, the ingress PE device may send a BUM packet including the egress node protection labels advertised by the egress PE devices for the failed PE device. When an egress PE device receives the BUM packet including the egress node protection labels, the egress PE device may determine whether an egress node protection label included in the BUM packet matches the egress node protection label from which the egress PE device advertised to the ingress PE device. In response to determining a match of the egress node protection labels, the egress PE device may determine whether the egress PE device is operating as a backup designated forwarder on an Ethernet segment identifier for which the failed node was the DF. If the egress PE device is operating as a backup designated forwarder, the egress PE device may forward the BUM traffic to the Ethernet segment. In this way, the backup DF may forward BUM traffic to the Ethernet segment even though the backup DF has not been transitioned to the DF through global repair, thereby reducing the occurrence of traffic black-holing.

In one example, a method includes receiving, by an ingress provider edge (PE) device of a plurality of PE devices configured with an Ethernet Virtual Private Network (EVPN) instance reachable by an Ethernet segment connecting a plurality of egress PE devices of the plurality of PE devices to a customer edge (CE) device that is multi-homed to the plurality of egress PE devices over the Ethernet segment, one or more egress node protection labels advertised by the plurality of egress PE devices. The method also includes determining, by the ingress PE device, that one of the egress PE devices configured as a designated forwarder has failed. The method further includes sending, by the ingress PE device and to the plurality of egress PE devices, Broadcast, unknown Unicast and Multicast (BUM) packets including the one or more egress node protection labels.

In another example, a method includes sending, by an egress provider edge (PE) device of a plurality of egress PE devices, one or more egress node protection labels to an ingress PE device, wherein the plurality of egress PE devices and the ingress PE device are configured with an Ethernet Virtual Private Network (EVPN) instance reachable by an Ethernet segment connecting the plurality of egress PE devices to a customer edge (CE) device that is multi-homed to the plurality of egress PE devices over the Ethernet segment. The method also includes receiving, by the egress PE device and from the ingress PE device, a Broadcast, unknown Unicast and Multicast (BUM) packet. The method further includes determining, by the egress PE device, whether the BUM packet includes the one or more egress node protection labels. The method further includes determining, by the egress PE device and in response to determining that the BUM packet includes the one or more egress node protection labels, whether the egress PE device is configured as a backup designated forwarder (DF) for the Ethernet segment. The method also includes sending, by the egress PE device and in response to determining that the egress PE device is configured as the backup DF, the BUM packet to network devices in the Ethernet segment.

In yet another example, a provider edge (PE) device comprises one or more programmable processors operably coupled to a memory, the memory configured to cause the one or more programmable processors to: receive one or more egress node protection labels advertised by a plurality of egress PE devices of a plurality of PE devices including the PE device, the plurality of PE devices configured with an Ethernet Virtual Private Network (EVPN) instance reachable by an Ethernet segment connecting the plurality of egress PE devices to a customer edge (CE) device that is multi-homed to the plurality of egress PE devices over the Ethernet segment; determine that one of the egress PE devices configured as a designated forwarder has failed; and send Broadcast, unknown Unicast and Multicast (BUM) packets including the one or more egress node protection labels.

In yet another example, a provider edge (PE) device comprises one or more programmable processors operably coupled to a memory, the memory configured to cause the one or more programmable processors to: send one or more egress node protection labels to an ingress PE device of a plurality of PE devices; receive, from the ingress PE device, a Broadcast, unknown Unicast and Multicast (BUM) packet; determine whether the BUM packet includes the one or more egress node protection labels; determine, in response to determining that the BUM packet includes the one or more egress node protection labels, whether the PE device is configured as a backup designated forwarder (DF) for the Ethernet segment; and send, in response to determining that the egress PE device is configured as the backup DF, the BUM packet to network devices in the Ethernet segment.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
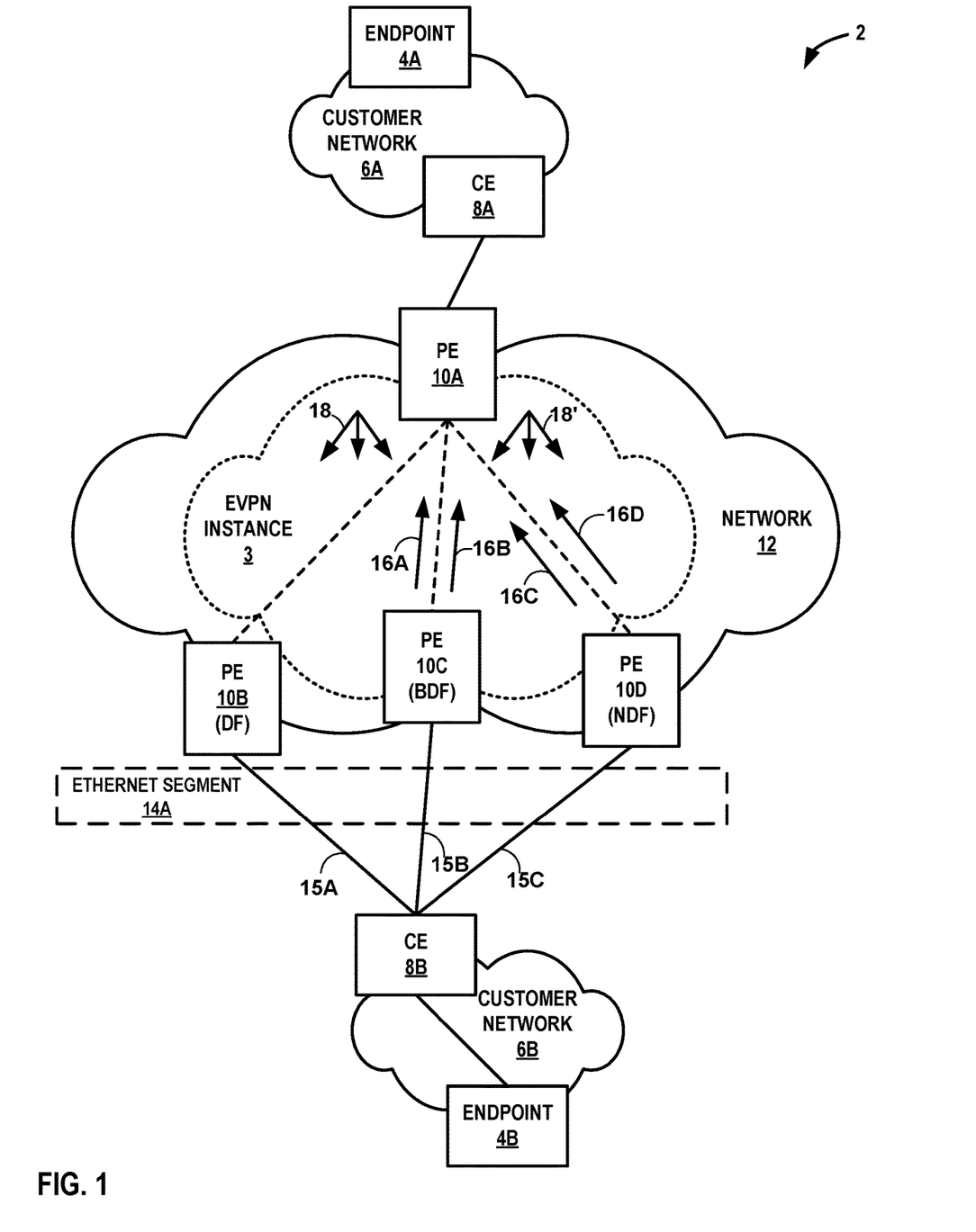
FIG. 1 is a block diagram illustrating a network system configured in accordance with one or more aspects of the techniques described in this disclosure.

FIG. 1 is a block diagram illustrating a network system 2 configured in accordance with one or more aspects of the techniques described in this disclosure. As shown in FIG. 1, network system 2 includes a network 12 and customer networks 6A-6B ("customer networks 6"). Network 12 may represent a public network that is owned and operated by a service provider to interconnect a plurality of edge networks, such as customer networks 6. Network 12 is a layer 3 ("L3") network in the sense that it natively supports L3 operations as described in the OSI model. Common L3 operations include those performed in accordance with L3 protocols, such as the Internet protocol ("IP"). L3 is also known as a "network layer" in the OSI model and the "IP layer" in the TCP/IP model, and the term L3 may be used interchangeably with "network layer" and "IP" throughout this disclosure. As a result, network 12 may be referred to herein as a Service Provider ("SP") network or, alternatively, as a "core network" considering that network 12 acts as a core to interconnect edge networks, such as customer networks 6.

Network 12 may provide a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by a service provider intermediate network 12 includes layer 2 ("L2") Ethernet Virtual Private Network ("EVPN") service. Network 12 represents an L2/L3 switch fabric for one or more customer networks that may implement an L2 EVPN service. An EVPN is a service that provides a form of L2 connectivity across an intermediate L3 network, such as network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and form a single L2 network. In a way, EVPN enables a form of a transparent local area network ("LAN") connection between two customer sites that each operates an L2 network and, for this reason, EVPN may also be referred to as a "transparent LAN service."

In the example of FIG. 1, provider edge network devices 10A-10D (collectively, "PE devices 10") provide customer endpoints 4A-4B (collectively, "endpoints 4") associated with customer networks 6 with access to network 12 via customer edge network devices 8A-8B (collectively, "CE devices 8"). PE devices 10 and CE devices 8 may each represent a router, switch, or other suitable network device that participates in an L2 virtual private network ("L2VPN") service, such as an EVPN. Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network system 2 illustrated in FIG. 1 is merely an example. For example, an enterprise may include any number of customer networks 6. Nonetheless, for ease of description, only customer networks 6A-6B are illustrated in FIG. 1.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

An EVPN may operate over a Multi-Protocol Label Switching (MPLS) configured network and use MPLS labels to forward network traffic accordingly. MPLS is a mechanism used to engineer traffic patterns within IP networks according to the routing information maintained by the network devices in the networks. By utilizing MPLS protocols, such as Label Distribution Protocol (LDP) or Resource Reservation Protocol with Traffic Engineering extensions (RSVP-TE), a source device can request a path (e.g., Label Switched Path (LSP)) through a network, e.g., network 12, to a destination device. An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path. Additional information with respect to the EVPN protocol is described in "BGP MPLS-Based Ethernet VPN," RFC 7432, Internet Engineering Task Force (IETF), February 2015, the entire contents of which is incorporated herein by reference.

To configure an EVPN, a network operator of network 12 configures, via configuration or management interfaces, various devices, e.g., PE devices 10, included within network 12 that interface with L2 customer networks 6. The EVPN configuration may include an EVPN instance ("EVI") 3, which comprises of one or more broadcast domains. EVPN instance 3 is configured within intermediate network 12 for customer networks 6 to enable endpoints 4 within customer networks 6 to communicate with one another via the EVI as if endpoints 4 were directly connected via an L2 network. Generally, EVI 3 may be associated with a virtual routing and forwarding instance ("VRF") (not shown) on a PE device, such as any of PE devices 10A-10D. Consequently, multiple EVIs may be configured on PE devices 10A-10D for an Ethernet segment, e.g., Ethernet segment 14, each of the EVIs providing a separate, logical L2 forwarding domain. As used herein, an EVI is an EVPN routing and forwarding instance spanning PE devices 10A-10D participating in the EVI. In the example of FIG. 1, each of PE devices 10 is configured with EVI 3 and exchanges EVPN routes to implement EVI 3.

In some examples, Ethernet Tags are used to identify a particular broadcast domain, e.g., a VLAN, in an EVI. A PE device may advertise a unique EVPN label per <Ethernet Segment Identifier (ESI), Ethernet Tag> combination. This label assignment methodology is referred to as a per <ESI, Ethernet Tag> label assignment. Alternatively, a PE device may advertise a unique EVPN label per media access control (MAC) address. In still another example, a PE device may advertise the same single EVPN label for all MAC addresses in a given EVI. This label assignment methodology is referred to as a per EVI label assignment.

In an EVPN configuration, a CE device is said to be multi-homed when it is coupled to two or more physically different PE devices on the same EVI when the PE devices are resident on the same physical Ethernet segment. For example, CE device 8B is coupled to PE devices 10B-10D via links 15A-15C, respectively, where PE devices 10B-10D are capable of providing L2 customer network 6B access to EVPN via CE device 8B. Multi-homed devices are often employed by network operators so as to improve access to EVPN provided by network 12 should a failure in one of egress PE devices 10B-10D or one of links 15A-15C occur. When a CE device is multi-homed to two or more PE devices, either one or all of the multi-homed PE devices are used to reach the customer site depending on the multi-homing mode of operation. In a typical EVPN configuration, PE devices 10B-10D participate in a designated forwarder (DF) election for each Ethernet segment identifier (ESI), such as the ESI for Ethernet segment 14. The PE device that assumes the primary role for forwarding BUM traffic to the CE device is called the designated forwarder ("DF"). The PE device that assumes the backup role for forwarding BUM traffic to the CE device is called the backup designated forwarder ("BDF" or "backup DF") and the PE device that is neither the DF nor the backup DF is referred to as a non-designated forwarder ("non-DF"). In the event of a failure to the DF, the PE device designated as a backup DF becomes the DF following a global repair process in which the current DF is withdrawn and a new DF election is performed.

To enable PE devices 10 connected to the same Ethernet segment 14 to automatically discover one another and for purposes of DF election (and backup DF election) per Ethernet segment, each of PE devices 10 advertises an Ethernet segment route (Type 4), which is typically unique across all EVPN instances (EVIs), for each of the Ethernet segments multi-homed by the PE. For example, each of PE devices 10 use Border Gateway Protocol (BGP) to advertise an Ethernet segment route that includes a Route Distinguisher (RD), ESI, and an originating network device's network address (e.g., IP address).

In addition, for each EVI, the EVPN protocol directs the router to output a routing protocol message advertising an Ethernet Auto-Discovery (AD) route (Type 1) specifying the relevant ESI for the Ethernet segment coupled to the EVPN instance. That is, each of PE devices 10 may advertise an Ethernet AD route per Ethernet segment to advertise reachability of the PE device for the Ethernet segment. For example, each of PE devices 10 for each EVI use BGP to advertise an Ethernet AD route that includes an RD (which may include, e.g., an IP address of the originating PE device), ESI, Ethernet Tag Identifier, and MPLS label. Each of the routes are advertised and imported by all multi-homed and remote PE devices that share the same EVI on the advertising ESI. In the example of FIG. 1, each of PE devices 10B-10D of EVI 3 advertise and import the routes described above to discover each other and to elect a designated forwarder for Ethernet segment 14.

Once the EVPN is operational for the {EVI, ESI} pair, PE devices 10B-10D output routing protocol messages to remote PE device 10A to announce media access control (MAC) addresses associated with customer equipment in customer network 6B. For example, PE devices 10 output BGP MAC routes including an RD, ESI, Ethernet Tag Identifier, MAC address and MAC address length, network address and network address length, and MPLS label, for example. Additional information with respect to the EVPN protocol is described in "BGP MPLS-Based Ethernet VPN," Internet Engineering Task Force (IETF), RFC 7432, February 2015, the entire content of which is incorporated herein by reference.

To enable delivery of BUM packets across the EVPN network, egress PE devices 10B-10D may each advertise an inclusive multicast (IM) (Type 3) route that provides ingress PE device 10A with the information about the tunnels that should be used when sending BUM packets. For example, each of PE devices 10 for each EVI use BGP to advertise an IM route that includes an RD, Ethernet Tag Identifier, network address length, and the originating network device's network address. That is, each of egress PE devices 10B-10D may advertise an IM route to enable ingress PE device 10A to deliver BUM traffic to the egress PE devices.

In the example of FIG. 1, PE device 10B is elected the DF, PE device 10C is elected a backup DF, and PE device 10D is a non-DF. In the event that PE device 10B goes down, e.g., node failure, BUM traffic cannot typically reach CE device 8B until a new DF is elected. PE device 10C, as the backup DF, may become the DF after performing global repair. To perform global repair, the failed designated forwarder PE device may typically advertise routes (e.g., Ethernet AD routes (Type 1) and Ethernet Segment routes (Type 4)) to withdraw the failed PE device from the Ethernet segment, which triggers a new DF election for the Ethernet segment. However, while performing global repair, traffic blackholing may occur. For example, the global repair process may take some time (e.g., depending on the topology, configuration and churn in the network), and as global repair is occurring, the ingress PE device may continue forwarding BUM traffic to the failed designated forwarder PE device before the backup DF transitions to the DF, which results in dropped packets ("black-holing").

In accordance with the techniques described in this disclosure, a backup DF configured as a "protecting backup DF", e.g., PE device 10C, may forward BUM traffic for an Ethernet segment even though the backup DF has not yet been elected the new DF for the Ethernet segment through global repair. In the example of FIG. 1, each of egress PE devices 10B-10D may advertise to ingress PE device 10A respective labels, e.g., egress node protection labels 16A-16D (collectively, "egress node protection labels 16" or "labels 16"), to indicate the egress PE device for which the advertising PE device is to protect. For example, PE device 10C may advertise label 16A (e.g.,"L-from-PE10C-to-protect-PE10B") to PE device 10A to indicate that PE device 10C may protect PE device 10B in the event PE device 10B fails, and may advertise label 16B (e.g., "L-from-PE10C-to-protect-PE10D") to PE device 10A to indicate PE device 10C may protect PE device 10D in case PE device 10D fails. Similarly, PE device 10D may advertise label 16C (e.g., "L-from-PE10D-to-protect-PE10B") to indicate that PE device 10D may protect PE device 10B in the event PE device 10B fails, and label 16D (e.g., "L-from-PE10D-to-protect-PE10C") to indicate PE device 10D may protect PE device 10C in the event PE device 10C fails. Egress PE devices 10B-10D may use control plane signaling with different route types to advertise the egress node protection labels. As one example, PE devices may advertise the egress node protection labels included in Inclusive Multicast Ethernet Tag (IMET) routes (EVPN type 3) in a BGP extended community. For ease of illustration, only labels 16 are illustrated, but each of the PE devices of an Ethernet segment may advertise respective egress node protection labels for each of the multi-homed PE devices for which the advertising PE device is to protect.

Without node failure to any of egress PE devices 10B-10D, ingress PE device 10A may generate BUM packets 18 with transport labels ("T-PE") and inclusive multicast ("IM") labels of the egress PE devices. The transport label may identify or otherwise correspond to a Label Switched Path (LSP) from PE device 10A to one of the egress PE devices. For example, ingress PE device 10A may include a transport label (e.g., T-PE10B) that identifies an LSP from PE device 10A to PE device 10B. Similarly, ingress PE device 10A may include a transport label (e.g., T-PE10C) that identifies an LSP from PE device 10A to PE device 10C. As yet another example, ingress PE device 10A may include a transport label (e.g., T-PE10D) that identifies an LSP for PE device 10A to PE device 10D.

The IM label may identify or otherwise correspond to a network address for which the ingress PE device 10A is to send the BUM packets. For example, as described above, ingress PE device 10A may receive IM routes from egress PE devices 10B-10D that indicate the network address for which PE device 10A is to send the BUM packets. In one instance, ingress PE device 10A may include an IM label (e.g., IM-PE10B) that identifies the network address of PE device 10B, an IM label (e.g., IM-PE10C) that identifies the network address of PE device 10C, and/or an IM label (e.g., IM-PE10D) that identifies the network address of PE device 10D. As one example implementation, ingress PE device 10A may generate BUM packets 18 including the labels as follows:

T-PE10B+IM-PE10B

T-PE10C+IM-PE10C

T-PE10D+IM-PE10D

In the event an egress PE device elected as DF fails, e.g., egress PE device 10B, ingress PE device 10A may, in addition to sending BUM packets 18, send BUM packets 18' that are a copy of BUM packets 18 that are modified to include the egress node protection labels associated with the failed egress PE device that were received from egress PE devices 10B-10D.

To detect whether the DF, e.g., PE device 10B, has failed, ingress PE device 10A may implement a Bidirectional Forwarding Detection (BFD) protocol. Examples of BFD may include session-BFD (S-BFD) or Multihop-BFD (MR-BED). Ingress PE device 10A may determine that PE device 10B has failed based on determining that BFD messages have not been received from PE device 10B in a configured time period, for example. In some instances, egress PE devices that exchange BFD messages to detect node failure may result in detection of false positives. For an underlay network except one in which RSVP-TE is used, there is a plurality of Equal-Cost Multi-Path (ECMP) paths between a given ingress/egress PE pair. Different packet flows, including the BFD packet flows, may take different paths through the underlay network. As such, the failure of the BFD session between a given ingress/egress PE pair may result in a false positive as the egress PE device may not have failed or that the non-BFD packet flows are not being received by the egress PE device. For example, egress PE devices may exchange BFD messages to detect node failure in an IP path. However, the IP path may still be up despite PE device 10B being down. To prevent the detection of false positives, ingress PE device 10A may establish an S-BFD session with each of egress PE devices 10B-10D to detect failures of egress PE devices over a data path, e.g., transport layer (e.g., layer 4) of the network stack. In this way, the ingress PE device may detect node failure on a data path to avoid detection of false positives that may occur if only the egress PE devices performed the detection of the multi-homed node failure on the IP path. Further description of S-BFD is described in C. Pignataro, et al., "Seamless Bidirectional Forwarding Detection (S-BFD)," Internet Engineering Task Force (IETF), RFC 7880, July 2016, the entire content of which is incorporated herein by reference.

In response to detecting that the DF, e.g., PE device 10B, has failed, ingress PE device 10A may send BUM packets 18' including the egress node protection labels associated with PE device 10B that were advertised by the other routers in Ethernet segment 14 (e.g., PE routers 10C and 10D) to protect PE device 10B. For the example illustrated in FIG. 1, ingress PE device 10A may generate BUM packets 18' that duplicates BUM packets 18 (e.g., the transport label and IM label) and are modified to include egress node protection label 16A (e.g., "L-from-PE10C-to-protect-PE10B") that was advertised by PE device 10C and egress node protection label 16C (e.g., "L-from-PE10D-to-protect-PE10B") that was advertised by PE device 10D. As one example implementation, ingress PE device 10A may send to each of egress PE devices 10B-10D BUM packets 18' with an inner label as egress node protection labels 16A and 16C, as illustrated below:

T-PE10C+L-from-PE10C-to-protect-PE10B+IM-
        PE10C

T-PE10D+L-from-PE10D-to-protect-PE10B+IM-
        PE10D

In some examples in which other PE devices (e.g., single-homed) (not shown) may also be configured with EVI 3, only the multi-homed PE devices (including the backup DF) for EVI 3 advertise the egress node protection labels and ingress PE device 10A may forward BUM packets 18' only to the egress PE devices that are multi-homed with the protected node (e.g., PE device 10B, 10C, and 10D). For example, only PE devices 10B-10D, and not the single-homed PE device, advertise egress node protection labels for PE devices of the ESI. In the event of a node failure, PE device 10A sends the BUM packet including the egress node protection label only to PE devices 10B-10D identified by the Ethernet AD routes, and not to the single-homed PE device. In this way, an ingress PE device may send a BUM packet including the egress node protection label to only the multi-homed egress PE devices and not to all PE devices configured with EVI 3 (e.g., the single-homed PE devices), thereby reducing the amount of BUM packets 18' sent.

In response to receiving BUM packets 18', each of PE devices 10B-10D may process the BUM packet 18' to determine whether to forward the packet to Ethernet segment 14. For example, PE device 10C may receive BUM packet 18' including the egress node protection labels shown above and may determine that the egress node protection label included in BUM packet 18' matches the egress node protection label that PE device 10C advertised to PE device 10A (e.g., "L-from-PE10C-to-protect-PE10B"). In response, PE device 10C may determine whether PE device 10C is configured as a backup DF on the ESI for which the failed node was the DF. In this example, PE device 10C may determine that it is configured as a backup DF and forwards the packet to Ethernet segment 14. PE device 10C may also receive BUM packet 18 that does not include the egress node protection labels and drops the packet since PE device 10C is not the designated forwarder.

Alternatively, in response to determining that the egress node protection label included in BUM packet 18' matches the egress node protection label that PE device 10D advertised to PE device 10A (e.g., "L-from-PE10D-to-protect-PE10B"), PE device 10D may determine that it is not configured as a backup DF (i.e., a non-DF) and drops the packet. PE device 10D may also receive BUM packet 18 that does not include the egress node protection labels and drops the packet since PE device 10D is not the designated forwarder.

When PE devices 10 complete global repair (e.g., route withdrawal and DF election), PE device 10C is elected as the DF. Upon completion of global repair, ingress PE device 10A may stop sending BUM packets including the egress node protection labels, e.g., BUM packets 18'. In instances in which ingress PE device 10 continues to send BUM packets 18', PE device 10C will drop the BUM packets 18' since PE device 10C is no longer the backup DF.

In some examples, egress PE devices 10B-10D may have a plurality of ESIs on which they are multi-homed. In these examples, an egress PE device, e.g., PE device 10C, may advertise a single egress node protection label to protect PE device 10B for the plurality of ESIs. In response to receiving BUM packets 18', PE device 10C may forward traffic only to those ESIs for which PE device 10C is the backup DF.

In some examples, ingress PE device 10A may stop sending BUM packets 18' before PE device 10C is elected as the new DF. In these examples, PE device 10A may include a timer (e.g., a timer to complete global repair) such that PE device 10A may stop sending BUM packets including egress node protection labels only after the expiration of the timer.

In some examples, one of egress PE devices 10B-10D may be the ingress for BUM traffic coming from CE device 8B. Assume for example PE device 10D is the ingress. In this example, PE device 10D may, in response to determining PE device 10B has failed, send BUM packets including egress node protection labels (e.g., labels 16) such that PE device 10C may use a split-horizon label to not send the BUM packet on the ESI. For example, the PE devices 10B-1D coupled to the multi-homed Ethernet segment 14A may apply the techniques described herein to provide split-horizon packet forwarding so as to ensure that packets from customer network 8B by PE device 10D are not forwarded back toward customer network 8B by PE device 10C connected to the same multi-homed Ethernet segment, e.g., Ethernet segment 14A. In particular, PE device 10D may send to PE device 10C a BUM packet including the egress node protection labels (e.g., "L-from-PE10C-to-protect-PE10B"), and may determine that the egress node protection label included in the BUM packet from PE device 10D matches the egress node protection label that PE device 10C advertised to PE device 10D. In response, PE device 10C may determine whether PE device 10C is configured as a backup DF on the ESI for which the failed node was the DF (e.g., PE device 10B). In this example, PE device 10C may determine that it is configured as a backup DF and provide split-horizon packet forwarding so as to ensure that the BUM packet from PE device 10D is not forwarded back to customer network 8B via Ethernet segment 14A.

The techniques provide one or more example technical advantages. For example, by advertising egress node protection labels, a backup DF may forward BUM traffic for an Ethernet segment even though the backup DF has not yet been elected the new DF. That is, the backup DF may be configured to forward BUM traffic that would otherwise have been dropped while global repair is occurring, thereby reducing traffic loss (e.g., black-holing) and improving traffic forwarding performance of the network system.

Figure 2:
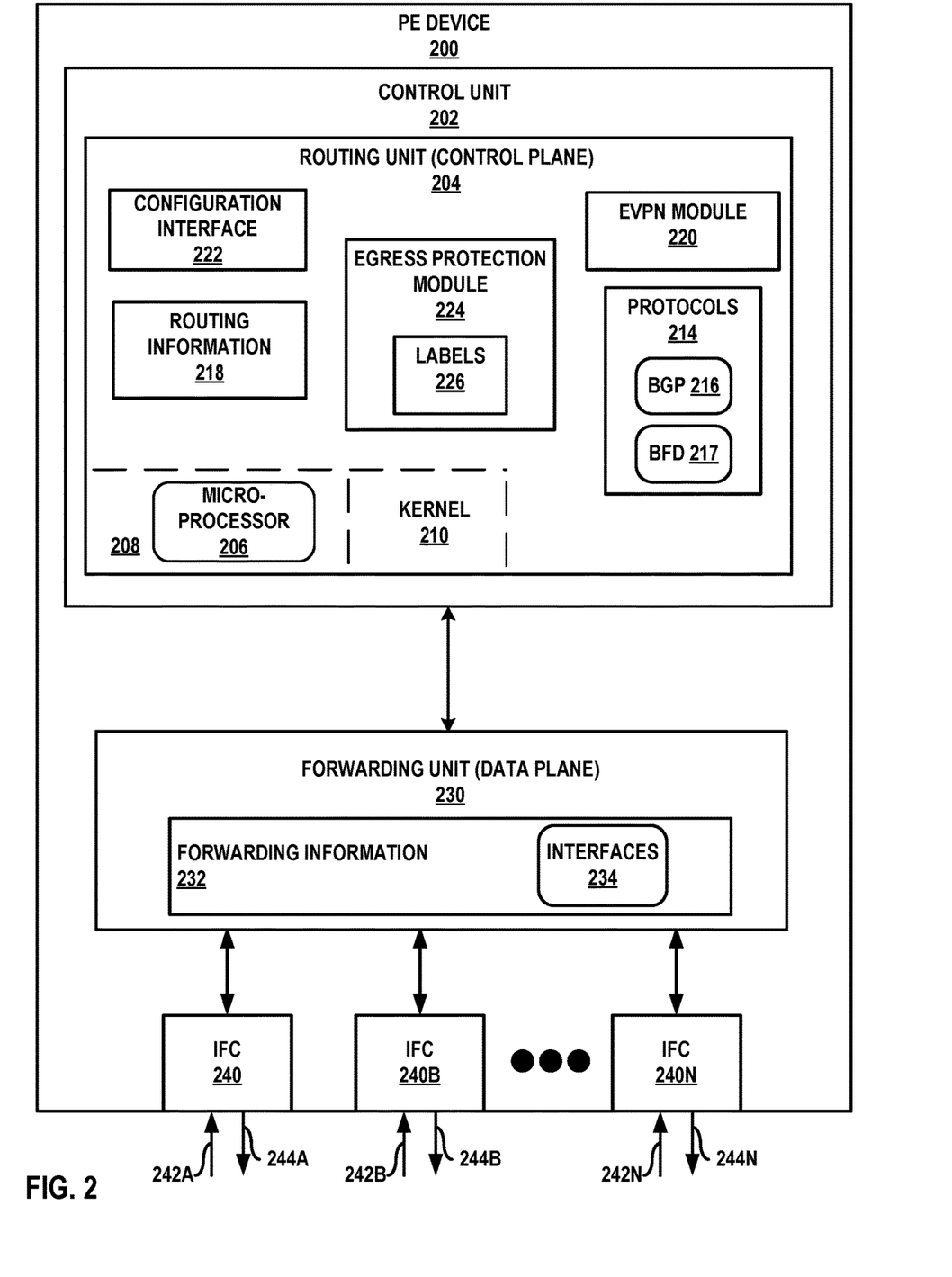
FIG. 2 is a block diagram illustrating an example of a provider edge device, in accordance to one or more aspects of the techniques described herein.

FIG. 2 is a block diagram illustrating an example of a provider edge network device according to the techniques described herein. PE device 200 is described with respect to PE devices 10A and 10C of FIG. 1, but may be performed by any PE device.

As shown in FIG. 2, PE device 200 includes a control unit 202 having a routing unit 204 (control plane), and control unit 202 that is coupled to forwarding unit 230 (data plane). Forwarding unit 230 is associated with one or more interface cards 240A-240N ("IFCs 240") that receive packets via inbound links 242A-242N ("inbound links 242") and send packets via outbound links 244A-244N ("outbound links 244"). IFCs 240 are typically coupled to links 242, 244 via a number of interface ports (not shown). Inbound links 242 and outbound links 244 may represent physical interfaces, logical interfaces, or some combination thereof.

Elements of control unit 202 and forwarding unit 230 may be implemented solely in software, or hardware, or may be implemented as combinations of software, hardware, or firmware. For example, control unit 202 may include one or more processors 206 that may represent, one or more microprocessors, digital signal processors ("DSPs"), application specific integrated circuits ("ASICs"), field programmable gate arrays ("FPGAs"), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory ("RAM"), read only memory ("ROM"), programmable read only memory (PROM), erasable programmable read only memory ("EPROM"), electronically erasable programmable read only memory ("EEPROM"), non-volatile random access memory ("NVRAM"), flash memory, a hard disk, a CD-ROM, a floppy disk, a cassette, a solid state drive, magnetic media, optical media, or other computer-readable media. Computer-readable media may be encoded with instructions corresponding to various aspects of PE device 200, e.g., protocols, processes, and modules. Control unit 202, in some examples, retrieves and executes the instructions from memory for these aspects.

Routing unit 204 operates as a control plane for PE device 200 and includes an operating system that provides a multi-tasking operating environment for execution of a number of concurrent processes. Routing unit 204 includes a kernel 210, which provides a run-time operating environment for user-level processes. Kernel 210 may represent, for example, a UNIX operating system derivative such as Linux or Berkeley Software Distribution ("BSD"). Kernel 210 offers libraries and drivers by which user-level processes may interact with the underlying system. Hardware environment 208 of routing unit 204 includes processor 206 that executes program instructions loaded into a main memory (not shown in FIG. 2) from a storage device (also not shown in FIG. 2) in order to execute the software stack, including both kernel 210 and processes executing on the operating environment provided by kernel 210.

Kernel 210 provides an operating environment that executes various protocols 214 at different layers of a network stack, including protocols for implementing EVPN networks. For example, routing unit 204 includes network protocols that operate at a network layer of the network stack. Protocols 214 provide control plane functions for storing network topology in the form of routing tables or other structures, executing routing protocols to communicate with peer routing devices and maintain and update the routing tables, and provide management interface(s) to allow user access and configuration of PE device 200. That is, routing unit 204 is responsible for the maintenance of routing information 218 to reflect the current topology of a network and other network entities to which PE device 200 is connected. In particular, routing protocols 214 periodically update routing information 218 to reflect the current topology of the network and other entities based on routing protocol messages received by PE device 200.

In the example of FIG. 2, routing protocols 214 include the Border Gateway Protocol ("BGP") 216 for exchanging routing information with other routing devices and for updating routing information 218. In EVPN, PE device 200 may use BGP to advertise to other PE devices the MAC addresses PE device 200 as learned from local customer edge network devices to which PE device 200 is connected. In particular, PE device 200 may use a BGP route advertisement message to announce reachability information for the EVPN, where the BGP route advertisement specifies one or more MAC addresses learned by PE device 200 instead of L3 routing information. PE device 200 updates routing information 218 based on the BGP route advertisement message. Routing protocols 214 may also include Bidirectional Forwarding Detection ("BFD") protocol 217 for exchanging BFD messages to detect node failure. In some examples, BFD protocol 217 may include seamless-BFD (S-BFD) or multihop-BFD (MH-BFD). Routing unit 204 may include other protocols not shown in FIG. 2, such as an MPLS label distribution protocol and/or other MPLS protocols.

Routing information 218 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, forwarding information 232 is generated based on selection of certain routes within the network and maps packet key information (e.g., L2/L3 source and destination addresses and other select information from a packet header) to one or more specific next hops forwarding structures within forwarding information 232 and ultimately to one or more specific output interface ports of IFCs 240. Routing unit 204 may generate forwarding information 232 in the form of a radix tree having leaf nodes that represent destinations within the network, a series of tables, a link list, a database, a flat file, or various other data structures.

Routing unit 204 also includes an EVPN module 220 that performs L2 learning using BGP 216. EVPN module 220 may maintain tables for each EVI established by PE device 200, or in alternative examples may maintain one or more tables that are independent of each respective EVI. PE device 200 may use EVPN module 220 to advertise, e.g., EVPN routes including Ethernet AD routes (Type 1) to advertise reachability of PE device 200 for an Ethernet segment, inclusive multicast (IM) routes (Type 3) to advertise information about PE device 200 that is used to send BUM traffic to PE device 200, and Ethernet segment routes (Type 4) to discover other PE devices of the Ethernet segment and for purposes of DF election (and backup DF election) for the Ethernet segment. EVPN module 220 may store information from the routes, such as the identification of PE devices of an Ethernet segment.

Routing unit 204 includes a configuration interface 222 that receives and may report configuration data for PE device 200. Configuration interface 222 may represent a command line interface; a graphical user interface; Simple Network Management Protocol ("SNMP"), Netconf, or another configuration protocol; or some combination of the above in some examples. Configuration interface 222 receives configuration data configuring the PE device 200, and other constructs that at least partially define the operations for PE device 200, including the techniques described herein. For example, an administrator may, after powering-up, activating or otherwise enabling PE device 200 to operate within a network, interact with control unit 202 via configuration interface 222 to configure, e.g., egress protection module 224.

Forwarding unit 230 represents hardware and logic functions that provide high-speed forwarding of network traffic. Forwarding unit 230 typically includes a set of one or more forwarding chips programmed with forwarding information that maps network destinations with specific next hops and the corresponding output interface ports. In general, when PE device 200 receives a packet via one of inbound links 242, forwarding unit 230 identifies an associated next hop for the data packet by traversing the programmed forwarding information based on information within the packet, e.g., in the case of BUM packet forwarding, the transport label and/or inclusive multicast label. Forwarding unit 230 forwards the packet on one of outbound links 244 mapped to the corresponding next hop.

In the example of FIG. 2, forwarding unit 230 includes forwarding information 232. In accordance with routing information 218, forwarding unit 230 stores forwarding information 232 that maps packet field values to network destinations with specific next hops and corresponding outbound interface ports. For example, routing unit 204 analyzes routing information 218 and generates forwarding information 232 in accordance with routing information 218. Forwarding information 232 may be maintained in the form of one or more tables, link lists, radix trees, databases, flat files, or any other data structures.

Forwarding unit 230 stores forwarding information 232 for each Ethernet VPN Instance (EVI) established by PE device 200 to associate network destinations with specific next hops and the corresponding interface ports. Forwarding unit 230 forwards the data packet on one of outbound links 244 to the corresponding next hop in accordance with forwarding information 232 associated with an Ethernet segment. At this time, forwarding unit 230 may push and/or pop labels from the packet to forward the packet along a correct LSP.

In accordance with the techniques described herein, routing unit 204 may include an egress protection module 224 that performs the techniques described in this disclosure. For example, in an example where PE device 200 is operating as an egress PE device (e.g., PE devices 10B-10D of FIG. 1), egress protection module 224 may generate egress node protection labels for each of the egress PE devices of the Ethernet segment for which PE device 200 is to protect. For example, egress protection module 224 may use EVPN module 220 to identify the PE devices of the Ethernet segment that includes PE device 200, generate and store labels for each of the PE devices of the Ethernet segment. The labels may each identify an egress PE device for which PE device 200 may protect in the event of a node failure. PE device 200 may, for example, use BGP 216 to advertise labels 226 (e.g., carried in EVPN Type 3 routes in a BGP extended community) to an ingress PE device (e.g., PE device 10A of FIG. 1). Egress protection module 224 may include a labels data structure 266 (e.g., "labels 226") for storing egress protection node labels advertised by PE device 200. Labels 226 may be one or more tables, lists, or other data structure. In some examples, labels 226 may be within routing information 218.

Egress protection module 224 of PE device 200 (operating as an egress PE device) may also configure interface commands 234 ("Interfaces 234") that control whether forwarding unit 230 forwards an incoming BUM packet on one of outbound links 244 to the Ethernet segment. For example, egress protection module 224 may configure interface commands 234 that determines whether an incoming BUM packet includes a label that was advertised to the ingress PE device, and if so, determine whether PE device 200 is configured as a backup DF on the ESI for which the failed node was the DF. For example, in response to receiving a BUM packet, egress protection module 224 may perform a lookup of labels 226 to determine whether a label included in the incoming BUM packet matches a label stored within labels 226. Interface commands 234 may configure the client-facing interface in an "up" state for when the label included in the incoming BUM packet matches a label within labels 226 and PE device 200 is configured as a backup DF. Interface commands 234 may also configure the client-facing interface in a "down" state for when the label included in the incoming BUM packet does not match a label stored within labels 226. Alternatively, or additionally, interface commands 234 may configure the client-facing interface in a "down" state for when the label included in the incoming BUM packet matches a label stored within labels 226 and PE device 200 is not configured as a backup DF. In some examples, interface commands 234 may include a route mapping the labels to one or more interfaces for the Ethernet segment. In response to determining that the PE device 200 is configured as a backup DF for the Ethernet segment, egress protection module 224 may perform a lookup of the egress node protection label to identify the stored route (e.g., the ESIs) to which the BUM packet is to be forwarded.

As one example implementation, egress protection module 224 may configure interface commands 234 as follows:

```
If Inner Label is IM label {
    Fwd using DF/NDF;
} else if (Inner Label is one of NP labels)
    Lookup in the context table pointed by NP
    Find protected PE10B from NP label
    for all esi_shared_with_PE10B) {
        if (PE10B_is_DF){
            if(I_am_BDF) {
                forward on esi;
            }
        }
    }
}
```

Where "IM label" is an inclusive multicast label, "NP labels" are node protection labels.

By implementing the above commands, for example, if PE device 200 receives a BUM packet not including egress node protection labels, forwarding unit 230 processes the incoming BUM packet based on interface commands 234, and processes the incoming BUM packet using standard DF forwarding techniques. If PE device 200 receives a BUM packet including a label that matches a label stored within labels 226 and is configured as a protecting backup DF, forwarding unit 230 processes the incoming BUM packet based on interface commands 234, and forwards the BUM packet to the Ethernet segment even though PE device is configured as a backup DF. Alternatively, if PE device 200 receives a BUM packet including a label that matches a label stored within labels 226 but is not configured as a backup DF (e.g., non-DF), forwarding unit 230 processes the incoming BUM packet based on interface commands 234, and drops the BUM packet.

In an example where PE device 200 is operating as an ingress PE device (e.g., PE device 10A of FIG. 1), PE device 200 may receive one or more egress node protection labels from egress PE devices via one of IFCs 240, and store the one or more egress node protection labels in labels 226 within egress protection module 224 (or in routing information 218).

Routing unit 204 of ingress PE device 10A may implement BFD protocol 217 to detect node failures. For example, ingress PE device 10A may determine that PE device 10B has failed based on determining that BFD messages have not been received from PE device 10B in a configured time period. In response to detecting a PE device elected as DF for the Ethernet segment has failed, egress protection module 224 of ingress PE device 10A may generate BUM packets that include the egress node protection labels received from the egress PE devices, e.g., labels 226. For example, egress protection module 224 may include in a BUM packet all egress node protection labels that were advertised to protect the failed PE device that is a designated forwarder. As one example implementation, egress protection module 224 of ingress PE device 10A may configure a backup path for each protected PE device. For example, egress protection module 224 of ingress PE device 10A may configure a first backup path for PE device 10B such that in the event PE device 10B fails, PE device 10A may forward BUM packets including the egress node protection labels to the first backup path. Egress protection module 224 of ingress PE device 10A may also configure a second backup path for PE device 10C such that in the event PE device 10C fails, PE device 10A may forward BUM packets including the egress node protection labels to the second backup path.

PE device 200, operating as an ingress PE device, may stop sending the BUM packets including egress node protection labels in response to a new DF election. In some examples, routing unit 204 of PE device 200 may include a timer (not shown) that egress protection module 224 may use to determine whether to stop sending BUM packets including egress node protection labels. For example, in response to determining that the timer has expired, egress protection module 224 may stop sending BUM packets.

Figure 3:
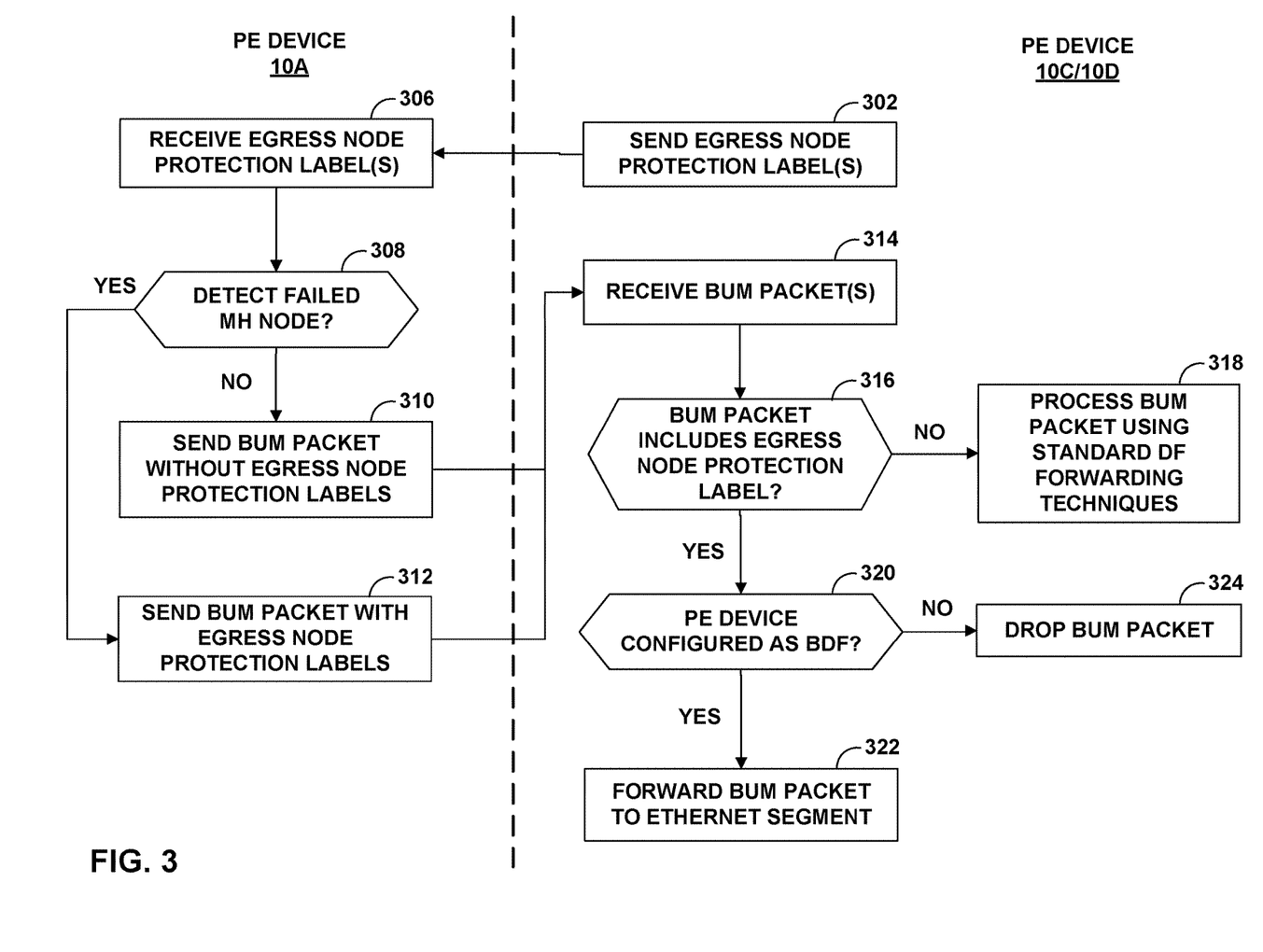
FIG. 3 is a flowchart illustrating an example operation of PE devices, in accordance with one or more aspects of the techniques described in this disclosure.

FIG. 3 is a flowchart illustrating an example operation of PE devices, in accordance with one or more aspects of the techniques described in this disclosure. FIG. 3 will be described with respect PE devices 10 of FIG. 1 and PE device 200 of FIG. 2.

In the example of FIG. 3, each of egress PE devices 10C and 10D that are multi-homed may send egress node protection labels to an ingress PE device 10A (302). For example, egress protection module 224 of PE device 10C may send to ingress PE device 10A an egress node protection label (e.g., label 16A) to protect PE device 10B in the event PE device 10B fails, and an egress node protection label (e.g., label 16B) to protect PE device 10D in the event PE device 10D fails. Similarly, egress protection module 224 of PE device 10D may send to ingress PE device 10A an egress node protection label (e.g., label 16C) to protect PE device 10B in the event PE device 10B fails, and an egress node protection label (e.g., label 16D) to protect PE device 10C in the event PE device 10C fails.

Ingress PE device 10A may receive the egress node protection labels from PE devices 10C and 10D (306) and may store the egress node protection labels. Ingress PE device 10A may detect whether a multi-homed egress PE device has failed (308). For example, ingress PE device 10A may implement BFD protocol 317 (e.g., S-BFD or MH-BFD) to detect whether any of the multi-homed egress PE devices (e.g., PE devices 10B-10D) has failed. If ingress PE device 10A does not detect a failure to any of the multi-homed egress PE devices ("NO" branch of step 308), then ingress PE device 10A may send BUM packets without egress node protection labels (e.g., BUM packets 18 of FIG. 1) toward egress PE devices 10B-10D. Alternatively, or additionally, if ingress PE device 10A detects a failure to any of the multi-homed egress PE devices ("YES" branch of step 308), then ingress PE device 10A may send BUM packets with egress node protection labels (e.g., BUM packets 18' of FIG. 1) toward egress PE devices 10B-10D. For example, egress protection module 224 of ingress PE device 10A may determine the egress node protection labels that correspond to the failed PE device 10A, and include the egress node protection labels to a replicated BUM packet. In some examples in which a single-homed router also belongs to the EVPN instance, ingress node PE device 10A may identify the multi-homed PE routers based on Ethernet AD routes advertised by the multi-homed PE routers, and send BUM packets including the egress node protection label to only the multi-homed PE devices and not to all PE devices configured with the EVPN instance, thereby reducing the amount of BUM packets sent.

Egress PE devices 10C and 10D may receive a BUM packet from ingress PE device 10A (314). Egress PE devices 10C and 10D may determine whether the BUM packet includes an egress node protection label (316). For example, PE devices 10C and 10D may each configure interface commands 234 to control the status of outgoing interfaces based on whether incoming BUM packet includes the egress node protection label and whether the PE device is configured as a backup DF on the ESI for which the failed node was the DF.

For example, PE device 10C may receive a BUM packet that does not include an egress node protection label ("NO" branch of step 316). In this case, PE device 10C may process the BUM packet using standard DF forwarding techniques (318). For example, PE device 10C may receive a BUM packet that does not include an egress node protection label, and since PE device 10C is configured as a backup DF (e.g., with an outgoing interface set to "down"), PE device 10C will drop the packet.

In some examples, PE device 10C may receive a BUM packet and determines whether the BUM packet includes the egress node protection label 16A (i.e., the label to protect PE device 10B) that PE device 10C had advertised to ingress PE device 10A. If the BUM packet includes egress node protection label 16A ("YES" branch of step 316), PE device 10C may then determine whether PE device 10C is configured as a backup DF on the ESI for which the failed node was the DF (320). If PE device 10C is configured as a backup DF ("YES" branch of step 320), then PE device 10C may forward the BUM packet to the Ethernet segment (322). For example, PE device 10C may configure interface commands 234 to set the outgoing interface to "up" such that PE device 10C may forward the BUM packet to the Ethernet segment if the BUM packet includes the egress node protection label and is configured as a backup DF. Alternatively, if the PE device 10C is not configured as a backup DF ("NO" branch of step 320), then PE device 10C will drop the BUM packet.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method comprising:
    receiving, by an ingress provider edge (PE) device of a plurality of PE devices configured with an Ethernet Virtual Private Network (EVPN) instance reachable by an Ethernet segment connecting a plurality of egress PE devices of the plurality of PE devices to a customer edge (CE) device that is multi-homed to the plurality of egress PE devices over the Ethernet segment, one or more egress node protection labels advertised by the plurality of egress PE devices, wherein the one or more egress node protection labels advertised by the plurality of egress PE devices comprises one or more egress node protections labels that identify each of the plurality of egress PE devices, including one or more egress node protection labels that identify one of the egress PE devices configured as a designated forwarder (DF);
    determining, by the ingress PE device, that the one of the egress PE devices configured as a designated forwarder has failed; and
    in response to determining that the designated forwarder has failed, sending, by the ingress PE device and to the plurality of egress PE devices, Broadcast, unknown Unicast and Multicast (BUM) packets including the one or more egress node protection labels that identify the one of the egress PE devices configured as the designated forwarder.

2. The method of claim 1, wherein sending the BUM packets comprises sending the one or more egress node protection labels that identify the one of the egress PE devices configured as the designated forwarder as inner labels of the BUM packets.

3. The method of claim 1, wherein the BUM packets including the one or more egress node protection labels comprises first BUM packets, the method further comprising:
    sending, by the ingress PE device and to the plurality of egress PE devices, second BUM packets without the one or more egress node protection labels that identify the one of the egress PE devices configured as the designated forwarder, wherein the first BUM packets are copies of the second BUM packets modified to include the one or more egress node protection labels that identify the one of the egress PE devices configured as the designated forwarder.

4. The method of claim 1, wherein a PE device of the plurality of egress PE devices is a backup designated forwarder, the method further comprising:
    determining, by the ingress PE device, whether the backup DF is a new DF resulting from global repair; and
    stopping, by the ingress PE device and in response to determining that the backup DF is the new DF resulting from global repair, the sending of BUM packets including the one or more egress node protection labels that identify the one of the egress PE devices configured as the designated forwarder.

5. The method of claim 4, wherein stopping the sending of BUM packets further comprises stopping the sending of BUM packets in response to determining that a timer for the global repair has expired.

6. The method of claim 1,
    wherein the EVPN instance includes a single-homed PE device, and
    wherein sending BUM packets including the one or more egress node protection labels that identify the one of the egress PE devices configured as the designated forwarder comprises sending the one or more egress node protection labels that identify the one of the egress PE devices configured as the designated forwarder only to the plurality of egress PE devices that are multi-homed to the CE device without sending the BUM packets to the single-homed PE device.

7. A method comprising:
    sending, by an egress provider edge (PE) device of a plurality of egress PE devices and to an ingress PE device, one or more egress node protection labels that identify each of the plurality of egress PE devices, wherein the plurality of egress PE devices and the ingress PE device are configured with an Ethernet Virtual Private Network (EVPN) instance reachable by an Ethernet segment connecting the plurality of egress PE devices to a customer edge (CE) device that is multi-homed to the plurality of egress PE devices over the Ethernet segment, wherein the one or more egress node protection labels comprises one or more egress node protection labels that identify one of the egress PE devices configured as a designated forwarder (DF);

receiving, by the egress PE device and from the ingress PE device, a Broadcast, unknown Unicast and Multicast (BUM) packet;

determining, by the egress PE device, whether the BUM packet includes the one or more egress node protection labels that identify the one of the egress PE devices configured as the designated forwarder;

determining, by the egress PE device and in response to determining that the BUM packet includes the one or more egress node protection labels that identify the one of the egress PE devices configured as the designated forwarder, whether the egress PE device is configured as a backup DF for the Ethernet segment; and sending, by the egress PE device and in response to determining that the egress PE device is configured as the backup DF, the BUM packet to network devices in the Ethernet segment.

8. The method of claim 7, wherein determining whether the BUM packet includes the one or more egress node protection labels comprises determining whether the one or more egress node protection labels included in the BUM packet received from the ingress PE device correspond to the one or more egress node protection labels that the egress PE device sent to the ingress PE device.

9. The method of claim 7, further comprising:
in response to determining that the egress PE device is not configured as the backup DF for the Ethernet segment, dropping, by the egress PE device, the BUM packet.

10. The method of claim 7, further comprising:
in response to determining that the BUM packet does not include the one or more egress node protection labels that identify the one of the egress PE devices configured as the designated forwarder, determining, by the egress PE device, whether the egress PE device is a designated forwarder; and
in response to determining that the egress PE device is not the designated forwarder, dropping, by the egress PE device, the BUM packet that does not include the one or more egress node protection labels that identify the one of the egress PE devices configured as the designated forwarder.

11. The method of claim 7, further comprising:
storing, by the egress PE device and to routing information, a route mapping the one or more egress node protection labels that identify the one of the egress PE devices configured as the designated forwarder to one or more interfaces for the Ethernet segment; and
in response to determining that the egress PE device is configured as the backup DF for the Ethernet segment, performing a lookup of the one or more egress node protection labels in the routing information to identify the stored route,
wherein sending the BUM packet to the network devices in the Ethernet segment comprises sending the BUM packet to the one or more interfaces of the stored route.

12. A provider edge (PE) device, comprising:
one or more programmable processors operably coupled to a memory, the memory configured to cause the one or more programmable processors to:
receive one or more egress node protection labels advertised by a plurality of egress PE devices of a plurality of PE devices including the PE device, the plurality of PE devices configured with an Ethernet Virtual Private Network (EVPN) instance reachable by an Ethernet segment connecting the plurality of egress PE devices to a customer edge (CE) device that is multi-homed to the plurality of egress PE devices over the Ethernet segment, wherein the one or more egress node protection labels advertised by the plurality of egress PE devices comprises one or more egress node protections labels that identify each of the plurality of egress PE devices, including one or more egress node protection labels that identify one of the egress PE devices configured as a designated forwarder (DF);
determine that the one of the egress PE devices configured as a designated forwarder has failed; and
send, in response to determining that the designated forwarder has failed, Broadcast, unknown Unicast and Multicast (BUM) packets including the one or more egress node protection labels that identify the one of the egress PE devices configured as the designated forwarder.

13. The PE device of claim 12, wherein, to send the BUM packets, the memory is further configured to cause the one or more programmable processors to send the one or more egress node protection labels that identify the one of the egress PE devices configured as the designated forwarder as inner labels of the BUM packets.

14. The PE device of claim 12, wherein the BUM packets including the one or more egress node protection labels that identify the one of the egress PE devices configured as the designated forwarder comprises first BUM packets, and wherein the memory is further configured to cause the one or more programmable processors to send second BUM packets without the one or more egress node protection labels that identify the one of the egress PE devices configured as the designated forwarder to the plurality of egress PE devices, wherein the first BUM packets are copies of the second BUM packets modified to include the one or more egress node protection labels that identify the one of the egress PE devices configured as the designated forwarder.

15. The PE device of claim 12, wherein the memory is further configured to cause the one or more programmable processors to:
determine whether a backup designated forwarder (DF) of the plurality of PE devices is a new designated forwarder resulting from global repair; and
stop, in response to determining that the backup DF is the new DF resulting from global repair, the sending of BUM packets including the one or more egress node protection labels that identify the one of the egress PE devices configured as the designated forwarder.

16. The PE device of claim 15, wherein to stop the sending of BUM packets, the memory is further configured to cause the one or more programmable processors to stop the sending of BUM packets in response to determining that a timer for the global repair has expired.

17. The PE device of claim 12,
wherein the EVPN instance includes a single-homed PE device, and
wherein sending BUM packets including the one or more egress node protection labels that identify the one of the egress PE devices configured as the designated forwarder comprises sending the one or more egress node protection labels that identify the one of the egress PE devices configured as the designated forwarder only to the plurality of egress PE devices that are multi-homed to the CE device without sending the BUM packets to the single-homed PE device.

\* \* \* \* \*